United States Patent
Barre et al.

(10) Patent No.: US 9,310,628 B2
(45) Date of Patent: Apr. 12, 2016

(54) OPHTHALMIC LENS INCLUDING ULTRA-THIN OPTICAL PARTS

(71) Applicant: JOHNSON & JOHNSON VISION CARE, INC, Jacksonville, FL (US)

(72) Inventors: Vincent H. Barre, Jacksonville, FL (US); Victor Lust, Jacksonville, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 66 days.

(21) Appl. No.: 14/011,364

(22) Filed: Aug. 27, 2013

(65) Prior Publication Data
US 2015/0062528 A1 Mar. 5, 2015

(51) Int. Cl.
*G02C 7/08* (2006.01)
*G02C 7/02* (2006.01)
*B29D 11/00* (2006.01)
*B29C 65/54* (2006.01)
*B29C 65/00* (2006.01)
*B29C 65/78* (2006.01)
*B29L 11/00* (2006.01)
*B29C 65/18* (2006.01)

(52) U.S. Cl.
CPC .............. *G02C 7/085* (2013.01); *B29C 65/542* (2013.01); *B29C 65/7841* (2013.01); *B29C 66/0016* (2013.01); *B29C 66/118* (2013.01); *B29C 66/545* (2013.01); *B29C 66/7352* (2013.01); *B29C 66/73366* (2013.01); *B29C 66/81422* (2013.01); *B29C 66/81423* (2013.01); *B29C 66/8322* (2013.01); *B29C 66/849* (2013.01); *B29D 11/00048* (2013.01); *B29D 11/00817* (2013.01); *G02C 7/024* (2013.01); *B29C 65/18* (2013.01); *B29L 2011/0016* (2013.01); *B29L 2011/0041* (2013.01)

(58) Field of Classification Search
CPC ........................................................ G02C 7/085
USPC ........................................ 351/159.34, 159.68
See application file for complete search history.

(56) References Cited

U.S. PATENT DOCUMENTS 4,540,532 A * 9/1985 Petcen et al. ................... 264/1.1
4,927,480 A 5/1990 Vaughan (Continued)

FOREIGN PATENT DOCUMENTS

EP 0435525 A2 7/1991

OTHER PUBLICATIONS

PCT International Search Report for PCT/US2014/052485 Date of Mailing Jan. 28, 2015 Date of Completion Oct. 22, 2014.

*Primary Examiner* — Jordan Schwartz

(57) ABSTRACT

The present invention provides for an optical assembly using two ultra-thin optical pieces/parts defining the outer bound of the assembly with a solid or liquid core and methods of forming said assembly. In particular, the present in invention discloses the handling and arrangements of said ultra-thin optical pieces to prevent deformation and loss of optical quality of said ultra-thin optical pieces. The ultra-thin optical pieces can be from 25-200 microns and their structural integrity can be preserved through uninterrupted support throughout the encapsulation of one or more fluids, e.g., a saline solution and an oil solution, which can be used to form a liquid meniscus lens. In some embodiments, interlocking features included in the ultra-thin optical parts can be included in order to help create the seal and/or provide structural support to the liquid lens assembly. In another embodiment, the supporting pieces to the ultra-thin optical components have an interlocking or centering mechanism, to aid in the assembly and sealing of said optical assembly.

19 Claims, 6 Drawing Sheets

(56) References Cited

U.S. PATENT DOCUMENTS

| | | | |
|---|---|---|---|
| 2009/0108478 A1* | 4/2009 | Lawton et al. | 264/2.5 |
| 2010/0079724 A1 | 4/2010 | Pugh et al. | |
| 2010/0155972 A1* | 6/2010 | Tollefson et al. | 264/1.1 |
| 2013/0150960 A1* | 6/2013 | DeBoer et al. | 623/6.13 |
| 2014/0055741 A1* | 2/2014 | Havenstrite et al. | 351/159.33 |
| 2014/0227437 A1* | 8/2014 | DeBoer et al. | 427/162 |
| 2014/0268023 A1* | 9/2014 | Pugh et al. | 351/159.24 |

* cited by examiner

OPHTHALMIC LENS INCLUDING ULTRA-THIN OPTICAL PARTS

TECHNICAL FIELD

The disclosure relates to ophthalmic lenses and, in particular, methods for molding and assembling ultra-thin optical parts for use as or in ophthalmic devices.

BACKGROUND OF THE INVENTION

Contact lenses have been used to improve vision for many years. Early designs of contact lenses were fashioned from hard materials, such as polymethyl methacrylate (PMMA). However, these lenses were uncomfortable and caused various problems for patients because of their relatively low permeability to oxygen. Soft contact lenses which were oxygen-permeable were later developed using materials based on hydrogels. Although hydrogel lenses are extremely popular today, the industry is continuously looking to improve the design of lenses or develop lenses specific to a certain condition.

For example, presbyopia is typically an age-related condition in which the eye's ability to focus on near objects progressively diminishes. The result for many people is the need for varifocal or bifocal glasses. Some of these glasses incorporate lenses that attempt to correct both near and far vision with the same lens. With respect to contact lenses, some people choose contact lenses to correct one eye for near and one eye for far, although side effects can include an interference with depth perception due to the loss of concurrent focusing of one eye in relation to the other eye.

Liquid lens technology has been gaining momentum with respect to use in medical imaging devices, microcameras, and fiber-optic telecommunication systems. A liquid lens uses one or more fluids to create a variable focus lens without any moving parts. In most cases, two immiscible fluids, one an electrically conducting aqueous solution and a nonconducting oil, are provided in a closed device. A hydrophobic coating may be applied to interior portions of the device, for example, to force the aqueous solution into a hemispherical lens-shaped configuration toward a portion of the device not having the hydrophobic coating. In a process called electrowetting, application of very minute direct current voltages across the hydrophobic coating decreases the repellency of the coating. The liquid's surface tension is changed through the process, which changes the radius of curvature in the meniscus, which in turn changes the focal length of the lens. A liquid lens is thus capable of transitioning from a convex (convergent) to a concave (divergent) lens shape with voltages as little as 0.1 microjoules and in just a few milliseconds.

A solution for presbyopia may rest on the ability to create a multiple state liquid meniscus lens that allows a person to control, for example, the zoom in and zoom out capability of the lens. However, the ability to manufacture this type of ophthalmic lens depends on the ability to create and assemble ultra-thin optical quality parts that are not deformed during manufacturing.

Designs of ophthalmic devices in accordance with aspects of the present disclosure rely on using ultra-thin materials that require extreme care in the shaping and handling of component parts. Even if handled with care, ultra-thin parts can often warp, curl, or irreversibly deform. Methods and systems are needed to enable assembly of, for example, a liquid filled ophthalmic device using ultra-thin parts that will not deform during shaping, handling, and assembly.

SUMMARY OF THE INVENTION

The present disclosure includes methods and apparatus for assembling ultra-thin component optical quality parts/pieces using a mold assembly with ejectable mold parts. The mold parts are designed to support and maintain the integrity of the fragile ultra-thin parts throughout the assembly process.

The present invention includes disclosure of an ophthalmic lens constructed from a plurality of ultra-thin parts, wherein each of the ultra-thin parts are maintained in contact with a support surface of a mold part throughout the assembly process. Separate mold parts, each with an ultra-thin part secured therein, are ejected from a molding apparatus prior to entering a liquid lens assembly station. The mold parts can be configured to mate inside an aqueous solution in the liquid lens assembly station in a manner that facilitates final assembly of the liquid lens prior to removal from the substrate.

According to some aspects of the present disclosure, an ophthalmic liquid lens device capable of being worn on an anterior surface of an eye is disclosed. The ophthalmic liquid lens device including: a liquid lens assembly including, a first ultra-thin optical part defined by a concave substrate surface of a first mold block, a second ultra-thin optical part defined by a convex substrate surface of a second mold block, one or more fluids contained between a cavity formed by the first ultra-thin optical part and the second ultra-thin optical part; a seal containing the one or more fluids in the cavity between the first ultra-thin optical part and the second ultra-thin optical part, the seal including interlocking features included in the periphery regions of said first ultra-thin optical part and said second ultra-thin optical part; and a hydrogel portion configured to support said liquid lens assembly.

In yet additional aspects of the present disclosure, a method of manufacturing a liquid lens suitable for an ophthalmic device is disclosed. The method including: defining a first ultra-thin optical part on a concave or convex substrate surface of a first mold block; defining a second ultra-thin optical part on a concave or convex substrate surface of a second mold block; containing one or more fluids between a cavity formed by the first ultra-thin optical part supported by the concave substrate surface of the first mold block and the second ultra-thin optical part supported by the convex substrate surface of the second mold block; creating a seal containing the one or more fluids in the cavity between the first ultra-thin optical part supported by the concave or convex substrate surface of the first mold block and the second ultra-thin optical part supported by the concave or convex substrate surface of the second mold block; and removing one or both of said first ultra-thin optical part from the supporting concave substrate surface of the first mold block and said second ultra-thin optical part from the supporting convex substrate surface of the second mold block.

Additional features, advantages, and embodiments of the invention may be set forth or apparent from consideration of the following detailed description and drawings. Moreover, it is noted that both the foregoing summary of the invention and the following detailed description are exemplary and intended to provide further explanation without limiting the scope of the invention as claimed.

DETAILED DESCRIPTION

Figure 1:
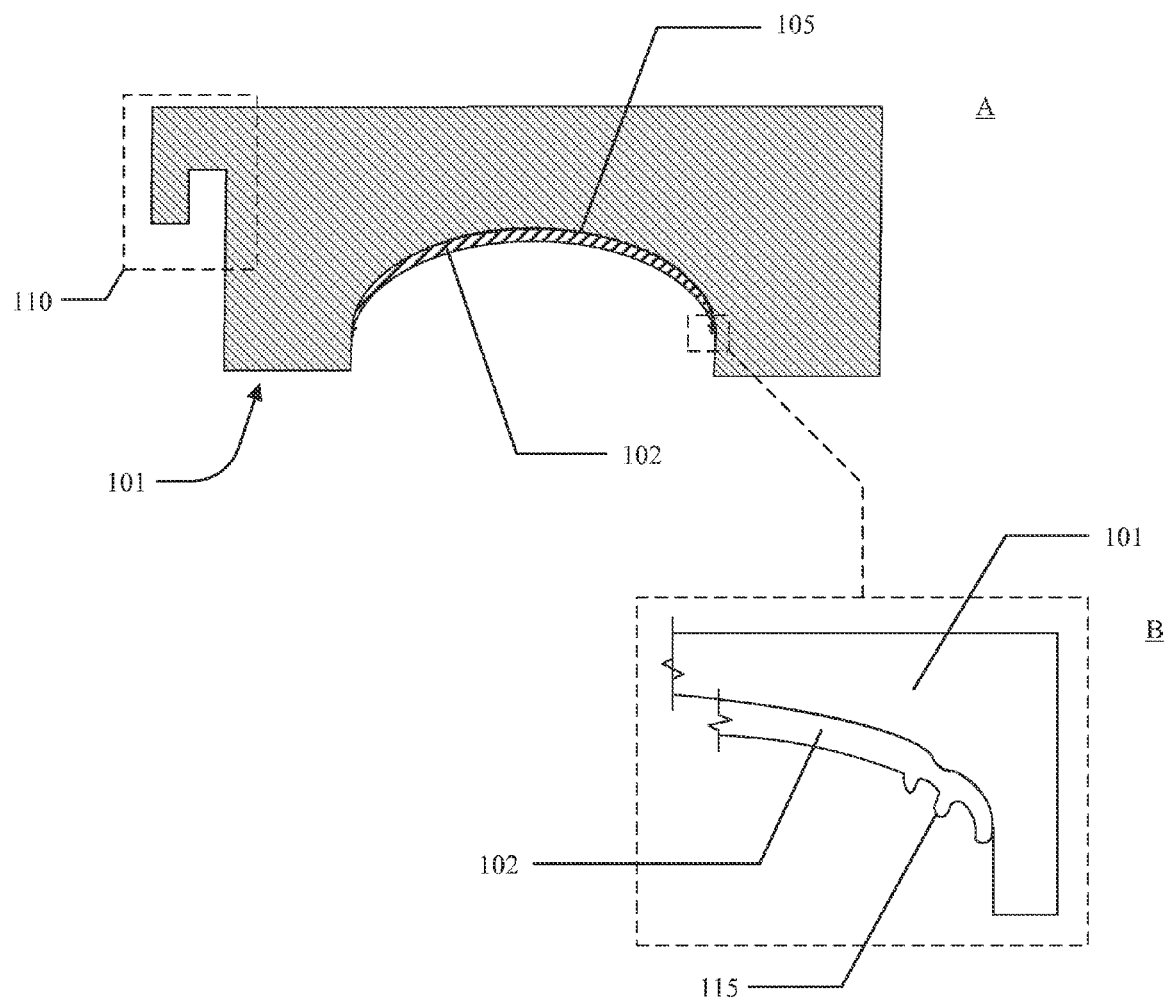
FIG. 1 illustrates a cross-sectional view A of an exemplary ultra-thin optical piece 102 on a concave substrate 101 and an enlarged section B of an edge of the ultra-thin optical piece 102 resting upon the substrate 101 according to aspects of the present disclosure.

The disclosure will now be described with reference to the drawing figures, in which like reference numerals refer to like parts throughout.

Various aspects of a method and apparatus for molding ultra-thin optical parts may be illustrated by describing components that are coupled, sealed, attached, and/or joined together. As used herein, the terms "coupled", "sealed", "attached", and/or "joined" are used to indicate either a direct connection between two components or, where appropriate, an indirect connection to one another through intervening or intermediate components. In contrast, when a component is referred to as being "directly coupled", "directly sealed", "directly attached", and/or "directly joined" to another component, there are no intervening elements present.

Relative terms such as "lower" or "bottom" and "upper" or "top" may be used herein to describe one element's relationship to another element illustrated in the drawings. It will be understood that relative terms are intended to encompass different orientations in addition to the orientation depicted in the drawings. By way of example, if aspects of a mold assembly shown in the drawings are turned over, elements described as being on the "bottom" side of the other elements would then be oriented on the "top" side of the other elements. The term "bottom" can therefore encompass both an orientation of "bottom" and "top" depending on the particular orientation of the apparatus.

Various aspects of a method and apparatus for molding ultra-thin optical pieces/parts may be illustrated with reference to one or more exemplary embodiments. As used herein, the term "exemplary" means "serving as an example, instance, or illustration," and should not necessarily be construed as preferred or advantageous over other embodiments of the methods and devices disclosed herein.

GLOSSARY

In this description and claims directed to the disclosed invention, various terms may be used for which the following definitions will apply:

"Contact Angle" as used herein, may refer to the angle at which the oil/saline solution interface, also referred to as the liquid meniscus boundary, meets the meniscus wall. In the case of a linear meniscus wall, the contact angle is measured as the angle between the meniscus wall and the line tangent to the liquid meniscus boundary at the point where the liquid meniscus boundary meets the meniscus wall. In the case of a curved meniscus wall, the contact angle is measured as the angle between the lines tangent to the meniscus wall and the liquid meniscus boundary at the point where they meet.

"Interlocking Features" as used herein, may refer to structural features located along the peripheral zone of the ultra-thin optical parts used to contain the one or more fluids in a Meniscus Cavity formed between two or more ultra-thin optical parts. In some embodiments, the structural features along the periphery can include a series of extending protrusions that can be made from the same material as the ultra-thin parts or from another material that can be rigid. The structural features can add structural rigidity to the overall optical assembly formed by the ultra-thin optical parts. In some embodiments, the structural features may be mated with corresponding sections of one ultra-thin optical piece to another ultra-thin optical piece using an aligning feature on the mold blocks. Mold blocks can include one or more substrate forming surfaces on which the optical ultra-thin parts can be formed and remain until the assembly is put together to thereby prevent deformation of the parts.

"Liquid Meniscus Boundary" as used herein, may refer to the arcuate surface interface between the saline solution and the oil. Generally, the surface will form a lens that is concave on one side and convex on the other.

"Media Insert" as used herein, may refer to a formable or rigid substrate capable of supporting an Energy Source within an Ophthalmic Lens. In some embodiments, the Media Insert can include one or more variable optic lenses.

"Meniscus Cavity" as used herein, may refer to the space in an arcuate liquid meniscus lens between the front curve lens and the back curve lens in which oil and saline solution are maintained.

"Meniscus Wall" as used herein, may refer to a specific area on the interior of the front curve lens, such that it is within the meniscus cavity, along which the liquid meniscus boundary moves.

"Ophthalmic Lens" as used herein, may refer to any ophthalmic device that is capable of residing in or on the eye. These devices can provide one or more of: optical correction, therapy, and may be cosmetic. For example, the biomedical ophthalmic device can refer to an energized contact lens, intraocular lens, overlay lens, ocular insert, optical insert, punctal plug, or other similar ophthalmic device through which vision is corrected or modified, an eye condition is enhanced or prevented, and/or through which eye physiology is cosmetically enhanced (e.g., iris color). In some embodiments, the ophthalmic device of the invention can include soft contact lenses made from silicone elastomers or hydrogels, which include but are not limited to silicone hydrogels, and fluorohydrogels.

"Optical Zone" as used herein, may refer to an area of an ophthalmic lens through which a wearer of the ophthalmic lens sees.

"Peripheral Zone" as used herein, the term "peripheral zone" or "non-optic zone" may refer to an area of an ophthalmic lens and/or liquid lens assembly outside of the optic zone of the ophthalmic lens, and therefore outside of a portion of the ophthalmic lens through which a lens wearer sees while wearing the ophthalmic lens on, near or in the eye in a normally prescribed fashion.

"Released from a mold" as used herein, may refer to a liquid lens assembly being either completely separated from one or more mold surfaces, or being only attached so that it can be removed with mild agitation or by a device without further mold movement. Examples of removal techniques can include, but are not limited to, pushed off with a swab, grabbed by a suction cup, or the use of another handling device.

"Sharp" as used herein, may refer to a geometric feature of an internal surface of either a front curve or back curve lens piece sufficient to contain the location of a contact line of two predefined fluids on the optic. The sharp is usually an outside corner rather than an inside corner. From a fluid standpoint it is an angle greater than 180 degrees.

"Substrate Forming Surface" as used herein, may refer to a surface that is used to mold lens pieces. In some embodiments, any such surface can include an optical finish, which indicates that it is sufficiently smooth and formed so that a lens surface fashioned by the polymerization of a lens forming material in contact with the molding surface can be optically acceptable. Further, in some embodiments, the substrate forming surface can have a geometry that is necessary to impart to the lens piece surface the desired optical characteristics, including without limitation, spherical, aspherical and cylindrical power, wavefront aberration correction, corneal topography correction and the like as well as any combinations thereof.

"Substrate" as used herein, the term Substrate, Mold, Block, or Mold Block may refer to a physical entity upon which other entities may be placed or formed.

Referring now to FIG. 1, a cross-sectional view A of an exemplary ultra-thin optical piece 102 on a Substrate 101 and an enlarged section B of an edge of the ultra-thin optical piece 102 resting upon the substrate 101 are illustrated. In some embodiments, the Substrate 101 can preferably be an ejectable mold part having at least one optical quality forming surface 105. Substrates 101 and 201 (shown in FIG. 2) materials can include any standard mold making materials, such as but not limited to steel, aluminum, high conductivity alloys like brass. More generally, these substrates can be of any material that can maintain precisely the shape of the ultra-thin optical piece 102 and 202. In the case of cross-linked ultra-thin optical parts, the substrates 101 and 201 can be adapted from further series of material that do not have the temperature resistance for metallic alloys, such as molded polymers, or other molded cross-linked structures.

Figure 2:
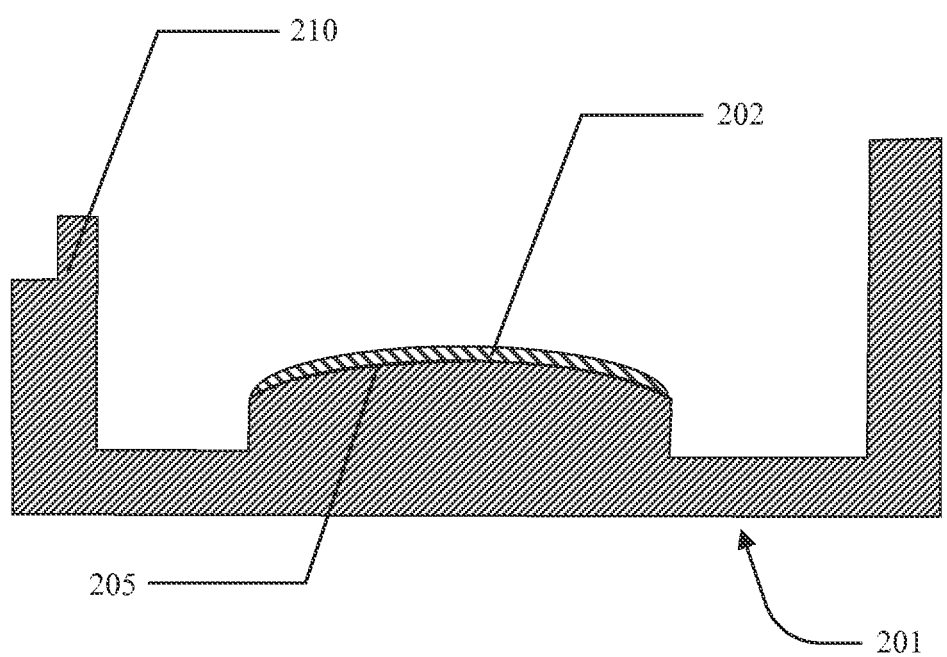
FIG. 2 illustrates a cross-sectional view of an exemplary convex substrate 201 supporting an ultra-thin optical piece 202 according to aspects of the present disclosure.

In some embodiments, the Substrate 101 can include alignment features 110 that can correspond to alignment features on a second Substrate or mold piece, e.g. Substrate 201 (shown in FIG. 2). In some aspects, the alignment features 110 can be used to assemble a liquid lens assembly 500 (shown in FIG. 5) using the ultra-thin optical piece 102 supported by the concave Substrate Forming Surface 105. In some embodiments, the alignment features 110 can include mechanical features, such as a kinematic mount, as well as additional electromechanical means.

The formed ultra-thin optical piece 102 can be, for example, between 200 and 25 microns and preferably about 100 microns thick. As a result, without the support from the Substrate 101, the ultra-thin optical piece 102 can deform losing its optical properties if it was to be released from the optical quality forming surface 105 before forming the liquid lens assembly 500. For example, in conventional mold systems, the cured ultra-thin optical piece 102 would typically be ejected from or physically removed from the optical quality forming surface 105 of the Substrate 101. The removed or ejected ultra-thin optical piece 102 would then be assembled with the other ultra-thin optical piece 202 separate from the molds. However, when dealing with such ultra-thin components as is the case with the ultra-thin optical pieces 102 and 202 (shown in FIG. 2), ejection by any means or handling of the ultra-thin optical piece 102 outside of the Substrates 101 or 102 can inevitably lead to warping, curling, or deformation in many cases.

Therefore, in accordance with various aspects of the present disclosure, to avoid the problems noted above with respect to the ejection or removal of the ultra-thin optical pieces 102 and 202 from their respective Substrates 101 and 201, the ultra-thin optical pieces 102 and 202 are never removed from their respective optical quality forming surface, e.g., 105, until the liquid lens assembly 500 is completely assembled. Rather, the substrates 101 and 201 can be responsible for maintaining the structural integrity of each ultra-thin optical piece 102 and 202 during assembly after they are themselves ejected from the ejectable block used to form the ultra-thin optical pieces 102 and 202. Accordingly, each of the ultra-thin optical pieces 102 and 202 remains structurally supported by at least a portion of the Substrate 101 or 201 that is ejected from the mold assembly, such as by the concave forming surface 105.

In some exemplary embodiments, the mold parts may include a back surface Substrate 101 and a front Surface substrate 201. As used herein, the term "front surface mold part" refers to the mold part whose concave optical quality forming surface 105 may be used to form the front surface of the ultra-thin optical piece 102. Similarly, the term "back surface mold part" refers to the substrate 201 whose convex optical quality forming surface 205 may form the back surface of the ultra-thin optical piece 202 (shown in FIG. 2). In some embodiments, Substrates 101 and 201 can be of a concavo-convex shape, including planar annular flanges which can surround the circumference of the uppermost edges of the concavo-convex regions of the Substrate 101 and/or 201.

Referring now to the enlarged section B of FIG. 1, an edge of the ultra-thin optical piece 102 supported by the substrate 101 is illustrated. In particular, Interlocking Features 115 located along the Peripheral Zone of the ultra-thin optical pieces 102 are depicted. In some embodiments, the Interlocking Features 115 can be used to help the structural integrity of the liquid lens assembly 500 (shown in FIG. 5), by helping to provide a seal once they are interlocked or "joined". The seal can be used to contain one or more liquids between two or more ultra-thin optical pieces, e.g. 102 and 202. The Interlocking Features 115 may be formed of the same material as the rest of the ultra-thin optical piece 102 or of a different material that is also rigid or semi-rigid. Materials can include, for example, polyolefins, Zenor, Topas, Polystyrene, and the like.

In some embodiments, the Interlocking Features 115 can add structural rigidity to each of the ultra-thin optical pieces 102 and 202 and to the overall liquid lens assembly 500 (shown in FIG. 5) formed. The Interlocking Features 115 may be radially symmetrical or non-symmetrical requiring radial alignment as well as overall alignment in relation with one another. Alignment of the ultra-thin optical pieces 102 and 202 may be accomplished, for example, using corresponding alignment features 110 and 210 of the Substrates 101 and 201 respectively, the use of kinematic mounts, electromechanical alignment means, and the such.

Referring now to FIG. 2, a cross-sectional view of an exemplary convex Substrate 201 supporting an ultra-thin optical piece 202 according to aspects of the present disclosure is illustrated. The convex Substrate 201 may include similar aspects to the previously described exemplary concave Substrate 101. For example, convex Substrate 201, like concave Substrate 101, may be part of a block assembly (not shown) used to form the ultra-thin optical piece 202 so that after formation of the ultra-thin optical pieces 102 and 202, the Substrates 101 and 201 may be ejected from the mold assemblies with each of the ultra-thin optical pieces 102 and 202 supported on an optical quality forming surfaces 105 and 205 respectively. Accordingly, the ultra-thin optical piece 202 can remain structurally supported by optical quality Substrate Forming Surface 205 after Substrate 201 is ejected from the mold assembly (not shown) to prevent any deformation and loss of optical quality of the ultra-thin optical piece 202. As previously mentioned, deformation and loss of optical quality of the ultra-thin optical piece 202 can occur due to the extremely thin nature of the ultra-thin optical pieces 102 and 202, as independent handling of either part can resemble the handling of a flexible, film-like material.

Because conventional tooling mechanisms and handling means in typical mold systems are not capable of handling the individual ultra-thin optical pieces 102 and 202 during assembly without warping, curling, or deforming the delicate structures of these parts. Constant structural support is required throughout the tooling process to maintain shape integrity and the material properties of the ultra-thin optical pieces 102 and 202 during production of the liquid lens assembly 500. Only when fully assembled into the liquid lens assembly 500 are the combined parts structurally capable of performing in an acceptable manner without the issues experienced by the parts individually.

Ultra-thin optical piece 202 can be formed in similar fashion to that for ultra-thin optical piece 102, except that the substrates 101 and 201 may be configured differently. In this manner, a second mold assembly for ultra-thin optical piece 202 may be used that is configured differently from that disclosed for ultra-thin optical piece 102 in order to impart the necessary optical qualities required for the back optic portion of the liquid lens assembly 500. For example, the amount of curvature imparted to ultra-thin optical piece 202 can be different compared to that imparted to ultra-thin optical piece 102. Accordingly, although some aspects of the present disclosure may be described only with respect to ultra-thin optical piece 102 and/or with respect to the mold assembly (not shown) or substrates 101 and 201, it should be understood that substantially the same methods, parts or devices will be apparent to those skilled in the art.

In some embodiments, aspects of the removable Substrate 201 may be specifically formed to assist in positioning of the Substrate 201 during the forming of the liquid lens and/or to ease ejection of the Substrate 201 from the mold assembly (not shown) after formation of the ultra-thin optical piece 202. For example, the Substrate's alignment features 210 can include mechanical features, such as a kinematic mount, as well as additional electromechanical means.

Figure 3:
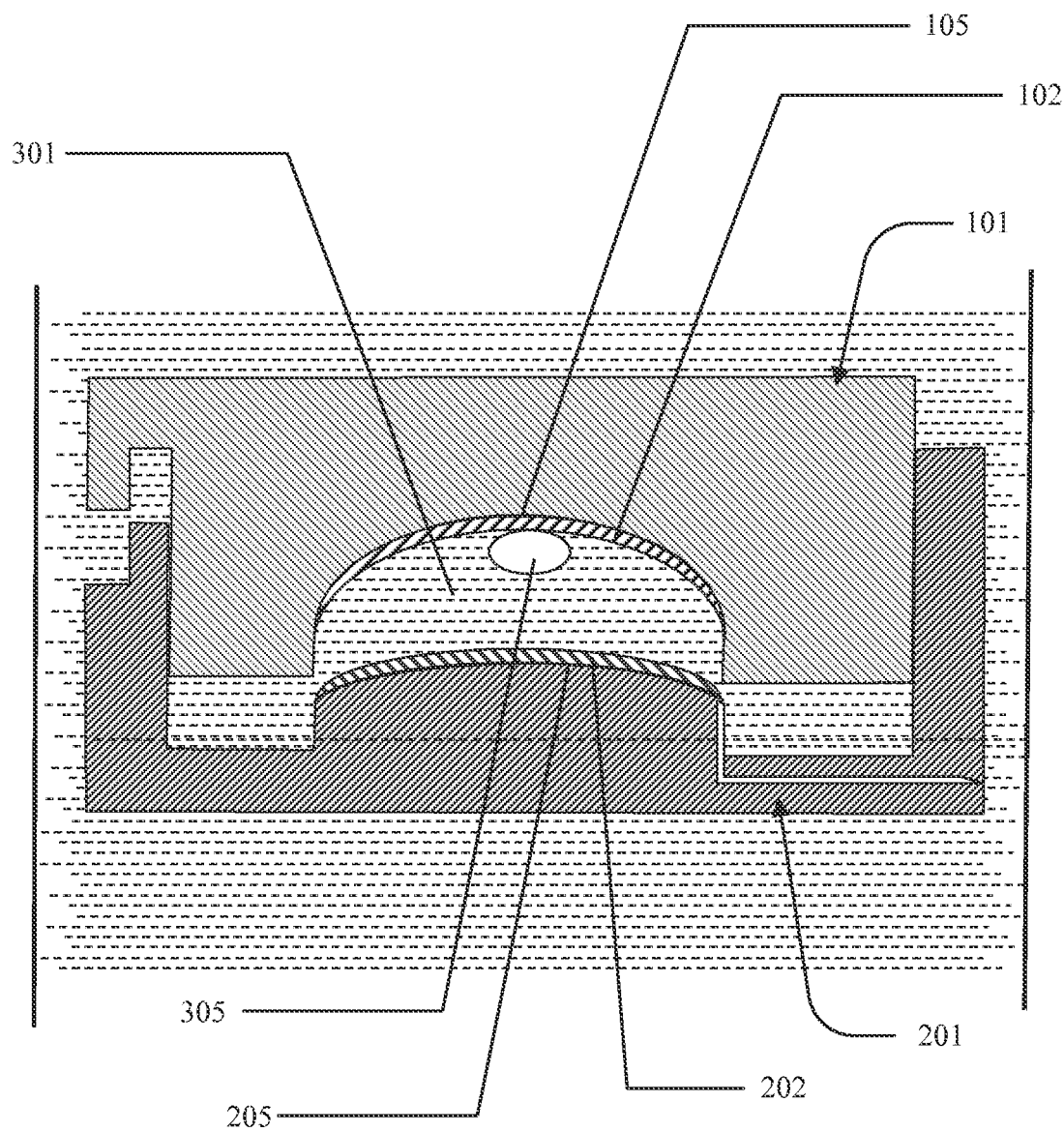
FIG. 3 illustrates the exemplary concave substrate 101 of FIG. 1 and the exemplary convex substrate 201 of FIG. 2 being assembled under a fluid according to aspects of the present disclosure.

Referring now to FIG. 3, the exemplary concave Substrate 101 of FIG. 1 and the exemplary convex Substrate 201 of FIG. 2 are illustrated being assembled under a fluid 301 according to aspects of the present disclosure. As previously presented, ejectable substrates 101 and 201 can support ultra-thin optical pieces 102 and 202 for the formation of a liquid lens assembly 500 under one or more fluids. For example, a saline solution 301 and an oil 305 may be contained in an arcuate shaped cavity formed between the two ultra-thin optical pieces 102 and 202. In some preferred embodiments, a volume of saline solution 301 contained within the cavity is greater than the volume of oil 305 contained within the cavity. Additionally, some preferred embodiments can include the saline solution 301 in contact with essentially an entirety of an interior surface of the back curve ultra-thin optical piece 202. Some embodiments may include a volume of oil 305 that is about 66% or more by volume as compared to an amount of saline solution 301. Some additional embodiments may include an arcuate liquid meniscus lens assembly 500 wherein a volume of oil 305 is about 90% or less by volume as compared to an amount of saline solution 301.

Figure 4:
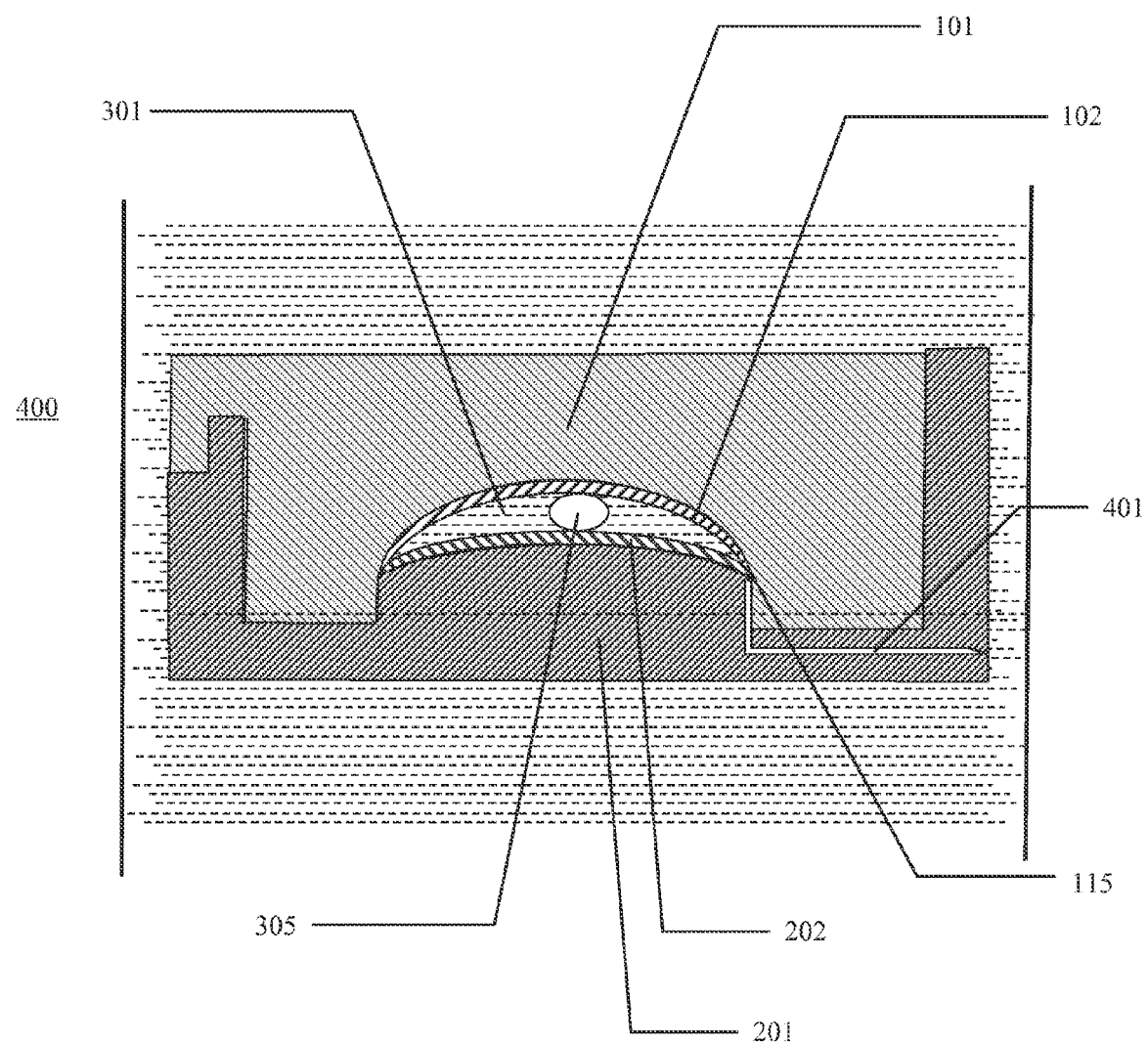
FIG. 4 illustrates ultra-thin optical pieces 102 and 202 assembled and sealed together containing one or more liquids therebetween according to aspects of the present disclosure.

In accordance with aspects of the present disclosure, the substrates 101 and 201 may be immersed in the aqueous solution 301 and, while in the aqueous solution, the Substrates 101 and 201 may be mated, as shown in FIG. 4. Thus, as described, Substrates 101 and 201 are removable components of a block used to form the ultra-thin optical pieces 102 and 202. The substrates 101 and 201 may be arrayed as a "sandwich" in a mold assembly 400 (shown in FIG. 4). The front surface mold Substrate 101 is on the top, with the concave forming surface 105 of the mold part facing downwards. The back surface Substrate 201 can be disposed symmetrically on the bottom of the front surface Substrate 101, with the convex forming surface 205 of the back surface substrate 101 projecting partially into the concave region of the front surface Substrate 101. Preferably, the back surface Substrate 201 can be dimensioned such that the convex surface 205 thereof engages the outer edge of the concave surface 105 of the front curve substrate 101 throughout its circumference, thereby cooperating to form a sealed cavity containing the saline solution 301 and the oil 305.

Referring now to FIG. 4, ultra-thin optical pieces 102 and 202 assembled and sealed together containing one or more liquids therebetween according to aspects of the present disclosure are depicted. The front curve Substrate 101 and the back curve Substrate 201 are assembled together forming the mold assembly 400 used to join the ultra-thin optical pieces 102 and 202 with the saline solution 301 and the oil solution 305 therein. In some embodiments, the mold assembly 400 may include a groove 401 in one of the Substrates 201 or 202 that can be used to deliver an adhesive used to seal the saline solution 301 and the oil solution 305 between the ultra-thin optical pieces 102 and 202. In alternative embodiments, the mold assembly may include a means to heat stake the ultra-thin optical pieces 102 and 202 together. In yet additional embodiments, the seal may be created by polymerizing the edges of the two ultra-thin optical pieces 102 and 202 or by joining Interlocking Features 115 forming part of the ultra-thin optical piece 102 with Interlocking Features of another ultra-thin optical piece or the piece itself, e.g. ultra-thin optical piece 202. In some embodiments, detents, protrusions, channels, or other formations, may be provided to assist with positioning the released substrates 101 and 201 to enable coordination with the adhesive delivery system or heat bonding system, for example.

Because the liquid lens assembly 500 (shown in FIG. 5) can be assembled inside the aqueous solution, once the ultra-thin optical pieces 102 and 202 are bonded/joined to each other, preferably about an outer periphery of each part, the one or more aqueous solution 301 and 305 can be compressed and trapped between the ultra-thin optical pieces 102 and 202 increasing the structural integrity of the part.

Figure 5:
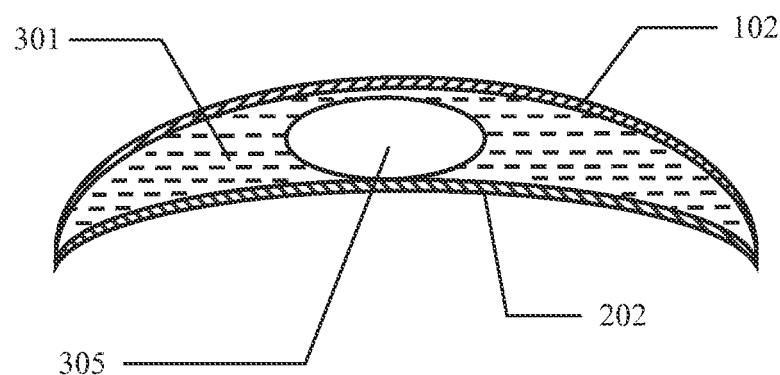
FIG. 5 illustrates a liquid lens 500 released from a mold assembly 400 after assembly of the ultra-thin optical pieces 102 and 202 in accordance with aspects of the present disclosure.

Referring now to FIG. 5, a liquid lens 500 released from the mold assembly 400 after joining the ultra-thin optical pieces 102 and 202 encapsulating the one or more liquids 301 and 305 is depicted. The structural integrity of the ultra-thin optical pieces 102 and 202 being exponentially greater due to the liquids 301 and 305 contained therein. The exponentially greater structural strength which can allow for some manipulation of the liquid lens 500 so that it can be incorporated and/or used as an ophthalmic lens without affecting the optical quality of the ultra-thin optical pieces 102 and 202. Accordingly, the liquid lens assembly 500 can have sufficient structure so that any further handling, cleaning, and/or packaging of the liquid lens assembly 500 will be resilient to irreversibly warp, curl or deform the lens surfaces of the individual ultra-thin optical pieces 102 and 202.

The flexural modulus of the first ultra-thin optical piece 102, for example, combined with the flexural modulus of the second ultra-thin optical piece 202, increases the structural stability of the device as a whole. Moreover, as the liquid lens assembly 500 can be forced into a state of deflection, such as by squeezing diametrically opposed portions of the periphery, quadratic momentum of the liquid trapped between the ultra-thin optical pieces 102 and 202 exponentially increases the resistance of liquid lens assembly 500 to continued deflection. The liquid lens assembly 500 thus tends to resist deflection in order to retain the preformed shape of each of the ultra-thin optical pieces 102 and 202 by virtue of the sealed solution between the ultra-thin optical pieces 102 and 202.

The liquid lens may be used to provide for an energized variable power liquid meniscus ophthalmic lens. For example, the ultra-thin optical pieces 102 and 202 can be transparent and the center may include a first liquid 301, which may be an insulative liquid, and a second liquid 305, which is an electrically conductive liquid. The first liquid 301 and the second liquid 305 are generally non-miscible liquids having different optical indices. An annular electrode (not shown), which is open facing a recess, may be positioned on a rear face of ultra-thin optical piece 202. Another electrode may be placed in contact with the conductive liquid 305. Application of a voltage across the electrodes is utilized to create electrowetting and modify the curvature of the interface between the two liquids, according to the voltage applied between the electrodes. A beam of light passing through the cell normal to the upper plate and the lower plate and in the region of the drop will be focused to a greater or lesser extent according to the voltage applied to the electrodes. The conductive liquid is typically an aqueous saline liquid, e.g. 301, and the insulating liquid is typically an oily solution, e.g. 305. However, in other embodiments within the scope of the disclosure, the center can include other types or combinations of non-gaseous media.

In some embodiments, the lens material may be any suitable polymer material, such as a hydrogel, silicone hydrogel, silicone acrylate, or fluoro-silicone acrylate. The lens material may initially be in a molten state and direct injected into the mold cavity, for example. The ultra-thin optical pieces 102 and 202 may be molded according to the same or other techniques, including, for example, spin-casting, lathing, diamond turning, or laser cutting. Although described herein with respect to a front optic portion and a rear optic portion, the methods and apparatus for molding and assembling ultra-thin optical pieces 102 and 202 may be used for molding any multiple molded parts conventionally requiring separate handling and assembly.

Figure 6:
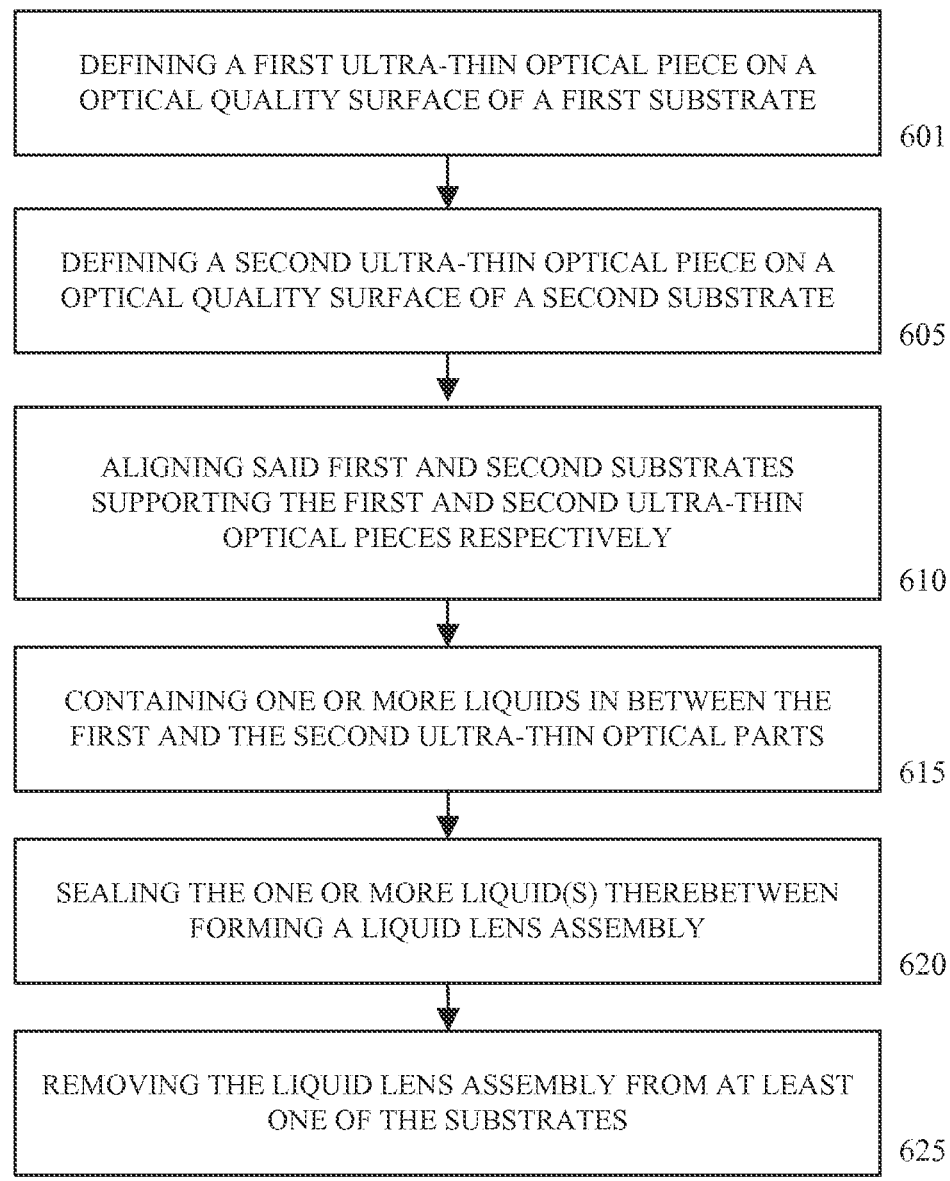
FIG. 6 illustrates method steps that can be used to manufacture ultra-thin optical parts for a liquid lens according to aspects of the present disclosure.

Referring now to FIG. 6 method steps 600 that can be used to manufacture ultra-thin optical parts for a liquid lens 500 according to aspects of the present disclosure are illustrated. Beginning at step 601, a first ultra-thin optical piece can be formed on a concave optical quality forming surface 105 of a first Substrate 101. At step 605, a second ultra-thin optical piece can be formed on a convex optical quality forming surface 205 of a second Substrate 201. Said first and second Substrates 101 and 201 can each form part of a block used to form each of the and a convex optical quality forming surface 205 respectively. The optical quality surfaces can be part of two different Substrates 101 and 201 each forming part of a block used to form the ultra-thin optical pieces 102 and 202. As previously mentioned, the ultra-thin optical pieces 102 and 202 may be formed and/or molded using techniques, including, for example, injection molding, spin-casting, lathing, diamond turning, or laser cutting.

At step 610, said first and second Substrates 101 and 201 supporting the first and second ultra-thin optical pieces 102 and 202 respectively can be aligned with each other. As discussed in the present disclosure, alignment may occur using alignment features 110 and 210 of the Substrates 101 and 201. As previously discussed, alignment features 110 and 210 can include electromechanical alignment means, mechanical means and the such.

At step 615, one or more liquids can be contained between the first and the second ultra-thin optical parts 102 and 202 without separating the ultra-thin optical pieces 102 and 202 from their respective Substrates 101 and 201. The one or more liquids can include a saline solution and an oil solution, e.g., 301 and 205 respectively, and be used to form a liquid lens assembly 500. In some embodiments, this step can take place by emerging both Substrates 101 and 201 into the solution. The oil 305 may be included through a structure of one of the Substrates 101 and 102 or by adding a drop of oil solution 305 after the Substrates 101 and 201 have been immersed into the saline solution 301. At step 620, the one or more solutions can be sealed therebetween forming a liquid lens assembly 500. The seal may be provided using the interlocking structures on the one or more ultra-thin optical pieces 102 and 202, the use of an adhesive, heat stacking, and other suitable techniques known to assemble optical parts in the art. At step 625, the liquid lens assembly 500 can be removed from at least one of the Substrates 101 and/or 201 to form part of an ophthalmic lens. In some embodiments, the liquid lens assembly 500 may be placed onto a hydrogel skirt. In alternative embodiments, the liquid lens assembly 500 may be encapsulated by hydrogel.

The many features and advantages of the invention are apparent from the detailed specification, and thus, it is intended by the appended claims to cover all such features and advantages of the invention which fall within the true spirit and scope of the invention. Further, because numerous modifications and variations will readily occur to those skilled in the art, it is not desired to limit the invention to the exact construction and operation illustrated and described, and accordingly, all suitable modifications and equivalents may be resorted to falling within the scope of the invention.

The invention claimed is:

1. An ophthalmic liquid lens device capable of being worn on an anterior surface of an eye, the ophthalmic liquid lens device comprising:
   a liquid lens assembly including,
   a first ultra-thin optical piece defined by a concave substrate surface of a first block,
   a second ultra-thin optical piece defined by a convex substrate surface of a second block,
   one or more fluids contained within a cavity formed between the first ultra-thin optical piece and the second ultra-thin optical piece;
   a seal containing the one or more fluids in the cavity between the first ultra-thin optical piece and the second ultra-thin optical piece, the seal including interlocking features included in the periphery regions of said first ultra-thin optical piece and said second ultra-thin optical piece; and
   a hydrogel portion configured to support said liquid lens assembly.

2. The ophthalmic lens of claim 1, wherein the interlocking structures defined in one or both the first ultra-thin optical piece and the second ultra-thin optical piece include a groove around the periphery useful to include an adhesive.

3. The ophthalmic lens of claim 1, wherein the interlocking structures defined in the first ultra-thin optical piece and the interlocking structures defined in the second ultra-thin optical piece are non-rotationally symmetrical.

4. The ophthalmic lens of claim 1, wherein said ultra-thin optical pieces are about 100 microns thick.

5. The ophthalmic lens of claim 1, wherein the one or more fluids include a saline solution and an oil and the volume of the oil is less than 10 percent the total volume of the cavity.

6. A method of manufacturing a liquid lens suitable for an ophthalmic device, the method comprising:
- defining a first ultra-thin optical piece on a concave substrate surface of a first block;
- defining a second ultra-thin optical piece on a convex substrate surface of a second block;
- defining interlocking features in at least a portion of the periphery of each of the first ultra-thin optical piece and the second ultra-thin optical piece;
- introducing one or more fluids into a cavity formed between the first ultra-thin optical piece and the second ultra-thin optical piece;
- creating a seal containing the fluids in the cavity between the first ultra-thin optical piece and the second ultra-thin optical piece; and
- removing one or both of said first ultra-thin optical piece from the supporting concave substrate surface of the first block and said second ultra-thin optical piece from the supporting convex substrate surface of the second block.

7. The method of claim 6, additionally comprising aligning the interlocking structures defined in the first ultra-thin optical piece with the interlocking structures defined in the second ultra-thin optical piece to create said seal containing the one or more fluids.

8. The method of claim 6, wherein the interlocking structures defined in the first ultra-thin optical piece and the interlocking structures defined in the second ultra-thin optical piece are rotationally symmetrical.

9. The method of claim 6, wherein the interlocking structures defined in one or both the first ultra-thin optical piece and the interlocking structures defined in the second ultra-thin optical piece include a groove around the periphery useful to include an adhesive.

10. The method of claim 6, wherein the interlocking structures defined in the first ultra-thin optical piece and the interlocking structures defined in the second ultra-thin optical piece are non-rotationally symmetrical.

11. The method of claim 10, wherein the alignment of non-rotationally symmetrical interlocking structures defined in the first ultra-thin optical piece and the non-rotationally symmetrical interlocking structures defined in the second ultra-thin optical piece are aligned using alignment features of said first and second block.

12. The method of claim 6, wherein the seal containing said one or more fluids is created while the first ultra-thin optical piece supported by said concave substrate surface of the first block and the second ultra-thin optical piece supported by said convex substrate surface of the second block are immersed in one or more fluid.

13. The method of claim 12, wherein the one or more fluids in the cavity comprises an oil in an amount that is less than 15 percent of the total volume of the cavity.

14. The method of claim 12, wherein the one or more fluids in the cavity comprises a saline solution in an amount that is greater than 90 percent of the total volume of the cavity.

15. The method of claim 6, additionally comprising the step of encapsulating the liquid lens assembly in a hydrogel material.

16. The method of claim 6, additionally comprising the step of placing the liquid lens assembly onto a hydrogel skirt.

17. The method of claim 13, further comprising at least one second fluid in the cavity, wherein the volume of the oil is less than 10 percent of the total volume of the fluids contained in the cavity formed between the first and the second ultra-thin optical pieces.

18. The method of claim 6, wherein said ultra-thin optical pieces are about 100 microns thick.

19. The method of claim 17, wherein the seal created to contain the one or more fluids includes adding an adhesive to at least a portion of the periphery of the first ultra-thin optical piece.

* * * * *